United States Patent [19]

Grammes

[11] 4,434,758
[45] Mar. 6, 1984

[54] DIESEL ENGINE

[75] Inventor: Gerhard Grammes, Meddersheim, Fed. Rep. of Germany

[73] Assignee: General Motors Corporation, Detroit, Mich.

[21] Appl. No.: 480,714

[22] Filed: Mar. 31, 1983

[30] Foreign Application Priority Data

Apr. 6, 1982 [DE] Fed. Rep. of Germany ... 8209819[U]

[51] Int. Cl.³ ............................................. F02B 3/00
[52] U.S. Cl. ..................................... 123/286; 123/269; 123/259
[58] Field of Search ........................ 123/286, 269, 259

[56] References Cited

U.S. PATENT DOCUMENTS

| 2,003,311 | 6/1935 | Ricardo | 123/286 |
| 2,106,124 | 1/1938 | Ricardo | 123/286 |
| 2,113,711 | 4/1938 | Ricardo | 123/286 |
| 2,316,794 | 4/1943 | Johnson | 123/286 |
| 2,795,215 | 6/1957 | Holt | 123/286 |
| 2,821,177 | 1/1958 | Holt | 123/286 |
| 2,911,959 | 11/1959 | Millington | 123/286 |
| 3,259,116 | 7/1966 | Bricout | 123/286 |
| 4,122,805 | 10/1978 | Kingsbury | 123/286 |

FOREIGN PATENT DOCUMENTS 226862 12/1924 United Kingdom ............... 123/286

Primary Examiner—Ronald B. Cox
Attorney, Agent, or Firm—Robert J. Outland

[57] ABSTRACT

In a turbulence chamber diesel engine, fuel consumption, smoke and noise are reduced by a transfer port arrangement having a plano-convex lens-like cross section with rounded off edges in which a convex side is disposed inwardly toward the cylinder axis and a flat side is disposed outwardly toward the cylinder periphery, the port cross-sectional area equals about 1% to 0.7% of that of the cylinder and the port angle of entry with the cylinder closed end is about 37° to 44°.

4 Claims, 3 Drawing Figures

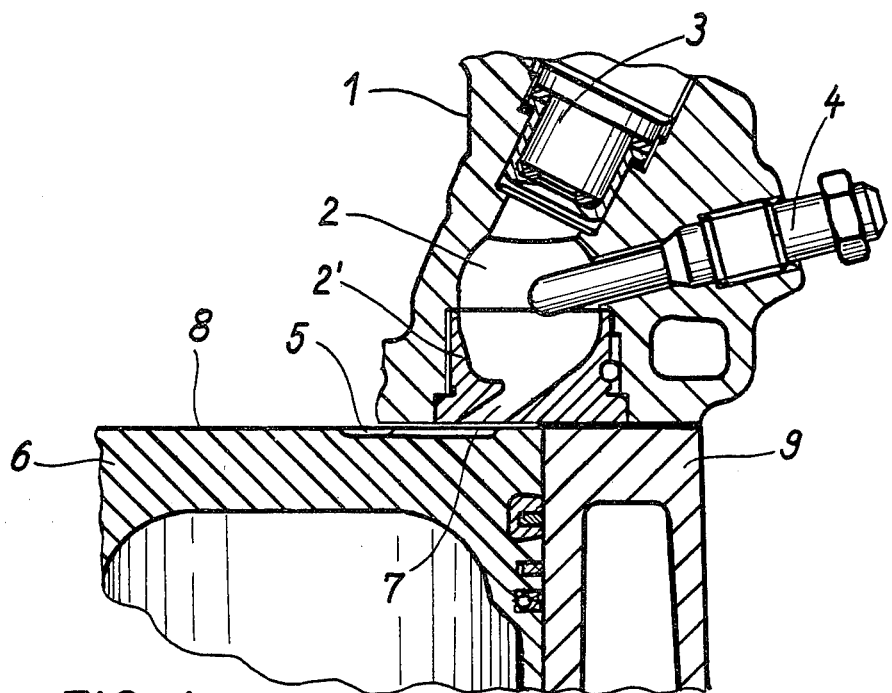
FIG. 1
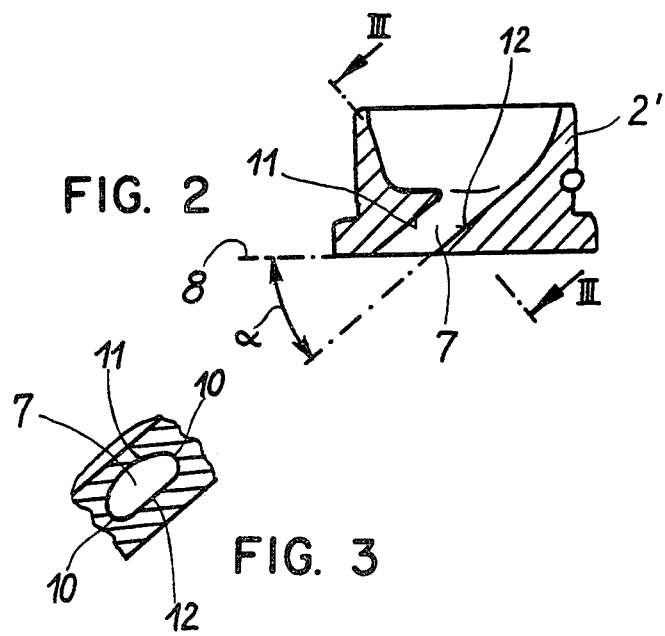
FIG. 2
FIG. 3

DIESEL ENGINE

The invention relates to diesel engines of the type wherein each cylinder is provided with a turbulence chamber, usually located in the cylinder head, and a transfer port arranged in the lower portion of the turbulence chamber, said transfer port extending towards the separating plane disposed between the cylinder head and cylinder block so as to form an acute angle (port angle) therewith, and being provided with a lens-shaped cross section, similar to the shape of a plano-convex lens having rounded-off edges.

In a prior art turbulence chamber of this type, the outer wall of the transfer port is convex and the inner wall, i.e., the wall disposed toward the center of the cylinder and piston, is flat (planar). In the same arrangement, the port angle relative to the separating plane disposed between the cylinder head and cylinder block amounts to 36° and the cross section of the transfer port covers an area of about 0.48 cm², which corresponds to about 1/100 of the piston surface area.

By virtue of these configurations, the international standards relative to black smoke emissions (ECE R 24.02) and the engine noise levels (EG 70/157) are being met.

It is an object of the present invention to propose means for reducing the black smoke emissions as well as lowering the noise level.

This objective may be achieved in a diesel engine of the foregoing type formed in accordance with the invention in that the inner wall of the transfer port, i.e., the wall disposed towards the center of the cylinder and piston, is of convex shape whereas the outer wall of the transfer port is flat (planar) and in that the transfer port has a cross-sectional area which corresponds to about 1% to 0.70% of the piston surface while its port angle ($\alpha$) is within a range of from 37° to 44°. Preferably, the cross-sectional area of the transfer port should amount to about 0.39 cm² (about 0.81% of the piston surface area) and the port angle ($\alpha$) to about 40°.

By virtue of the configuration proposed in the present invention, both the level of black smoke emissions and the noise level are considerably reduced. Depending on engine speed, the black smoke emissions alone are reduced by about 75% to 90%. Furthermore, fuel consumption is reduced by about 10% by virtue of the improved combustion that is realized.

The invention will be described in detail by way of one exemplary embodiment with reference to the accompanying drawings, wherein:

FIG. 1 is a longitudinal partial section of the cylinder block in the upper cylinder region and of the cylinder head in the region of the turbulence chamber;

FIG. 2 is a longitudinal section of the turbulence chamber insert, and

FIG. 3 is a section along line III—III through the transfer port of the turbulence chamber insert.

Cylinder head (1) incorporates turbulence chamber (2), injection nozzle (3) and glow plug (4). One portion of the turbulence chamber (2) is formed by the turbulence chamber insert (2') and includes the transfer port (7) which extends at an acute angle toward and terminates at the main combustion chamber (5) disposed in the piston (6). The inlet angle $\alpha$, which is formed between the transfer port (7) and the separating plane (8) disposed between the cylinder head (1) and cylinder block (9), amounts to 40°. The cross-sectional shape of the transfer port is that of a plano-convex focusing lens with its edges (10) rounded off. The inward wall of the transfer port, i.e., the wall disposed towards the center of the cylinder and piston, is defined by the convex surface (11) whereas the outward wall is defined by the flat surface (12). With a length/width ratio of about 2:1, the cross-sectional area of the transfer port amounts to about 0.39 cm². Based on tests conducted in accordance with ECE guide lines, the levels of black smoke gas emissions measured at 3,000 r.p.m. and at 4,600 r.p.m. were 0.8 and 0.4, respectively, both of these values being considerably below the threshold values outlined in these standards.

The embodiments of the invention in which an exclusive property or privilege is claimed are defined as follows:

1. A diesel engine having a cylinder with a closed end defining a plane, a piston in the cylinder having a portion facing the closed end and defining therewith a main combustion chamber, a turbulence chamber having a closest side adjacent but spaced longitudinally beyond the cylinder, a transfer port connecting the main combustion chamber with said closest side of the turbulence chamber through the cylinder closed end and forming an acute port entry angle with said plane, said transfer port having a lens-like cross section, as in a plano-convex lens having opposite convex and flat sides with rounded-off edges, characterized in that the convex side is disposed inwardly toward the center of the cylinder and the flat side is disposed outwardly away from the center of the cylinder, the transfer port has a cross-sectional area of not more than 1% nor less than 0.7% of the cross-sectional area of the cylinder and said port entry angle has a value of not less than 37° nor more than 44°.

2. A diesel engine according to claim 1 wherein said port entry angle has a value between 39° and 41°.

3. A diesel engine according to claim 1 wherein said cross-sectional area of the transfer port is not less than 0.75% nor more than 0.85% of the cross-sectional area of the cylinder.

4. A diesel engine according to claim 1 wherein said cross-sectional area of the transfer port is not less than 0.75% nor more than 0.91% of the cross-sectional area of the cylinder.

* * * * *